Aug. 1, 1950 F. R. AMBROSE 2,517,373
LOAD LIMITING DRIVE MECHANISM
Filed June 29, 1949 2 Sheets-Sheet 1

INVENTOR.
FELIX R. AMBROSE
BY
Clark Hitt
ATTORNEYS

Aug. 1, 1950

F. R. AMBROSE 2,517,373

LOAD LIMITING DRIVE MECHANISM

Filed June 29, 1949

INVENTOR.
FELIX R. AMBROSE
BY
Clark & Ott
ATTORNEYS

Patented Aug. 1, 1950

2,517,373

UNITED STATES PATENT OFFICE 2,517,373

LOAD LIMITING DRIVE MECHANISM

Felix R. Ambrose, West Englewood, N. J., assignor to Air Associates, Incorporated, Teterboro, N. J., a corporation of New Jersey Application June 29, 1949, Serial No. 101,970

7 Claims. (Cl. 318—475)

This invention relates to a load limiting drive mechanism.

The invention is directed to a drive mechanism which automatically discontinues operation when a predetermined load is attained on the power source.

Another object of the invention is to provide a load limiting drive mechanism which functions to discontinue operation thereof when the torque on the driving gear exceeds a predetermined limit.

Still another object of the invention is to provide a drive mechanism of the indicated character in which the driving gear is mounted on a worm for movement axially thereof against a spring to actuate a limit switch when the load on the gear exceeds the tension of the spring.

Still another object of the invention is to provide a load limiting drive mechanism for moving a linear actuator in opposite directions so as to move an operational part of aircraft and the like to different positions and for automatically discontinuing the drive mechanism in the event that the operational part becomes jammed or meets with an obstruction.

With the foregoing and other objects in view, reference is now made to the following specification and accompanying drawings in which the preferred embodiment of the invention is illustrated.

Figure 1:
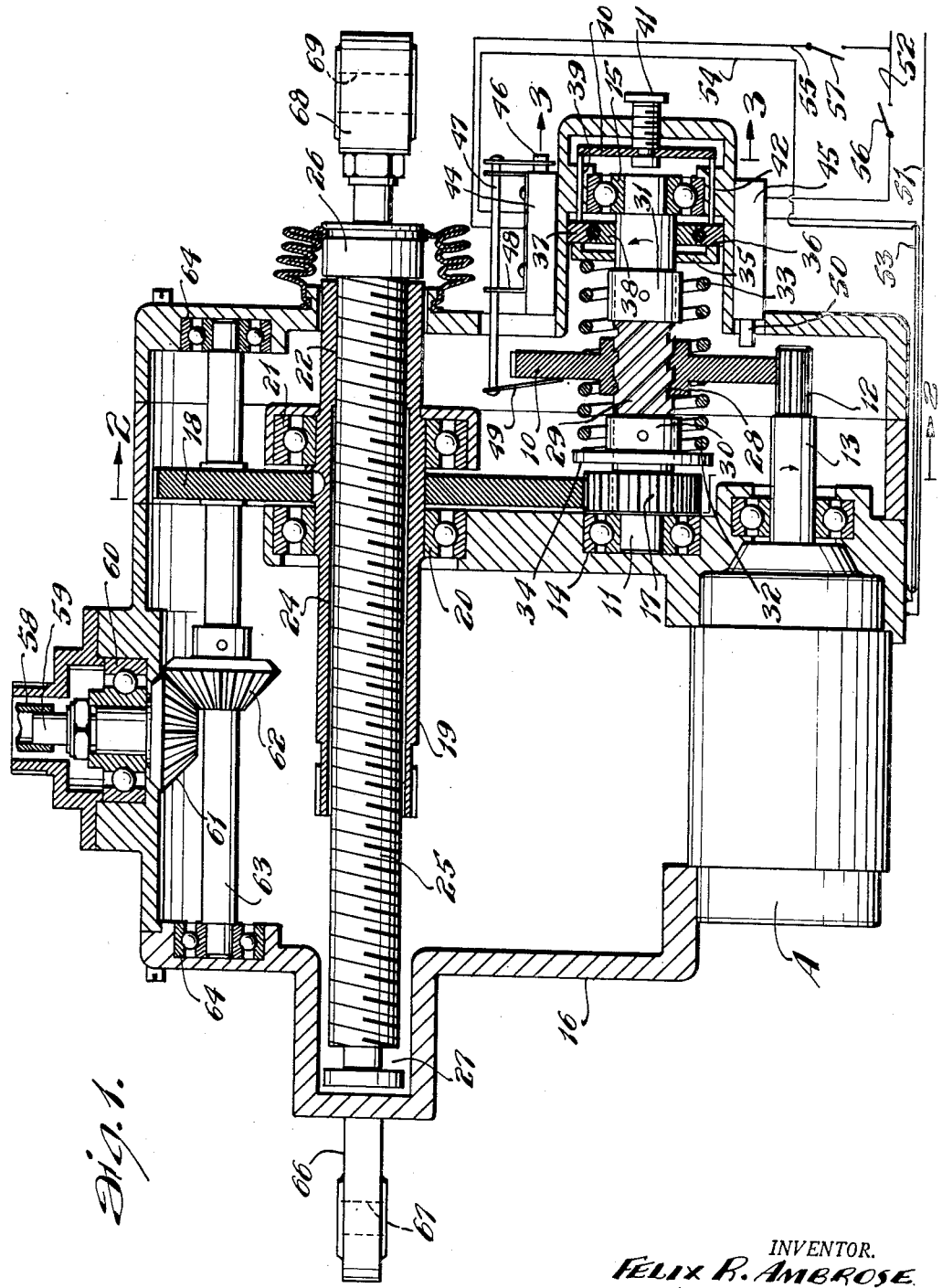
Fig. 1 is a vertical sectional view through a load limiting drive mechanism constructed in accordance with the invention and illustrating the same operatively connected with a linear actuator.
Figure 2:
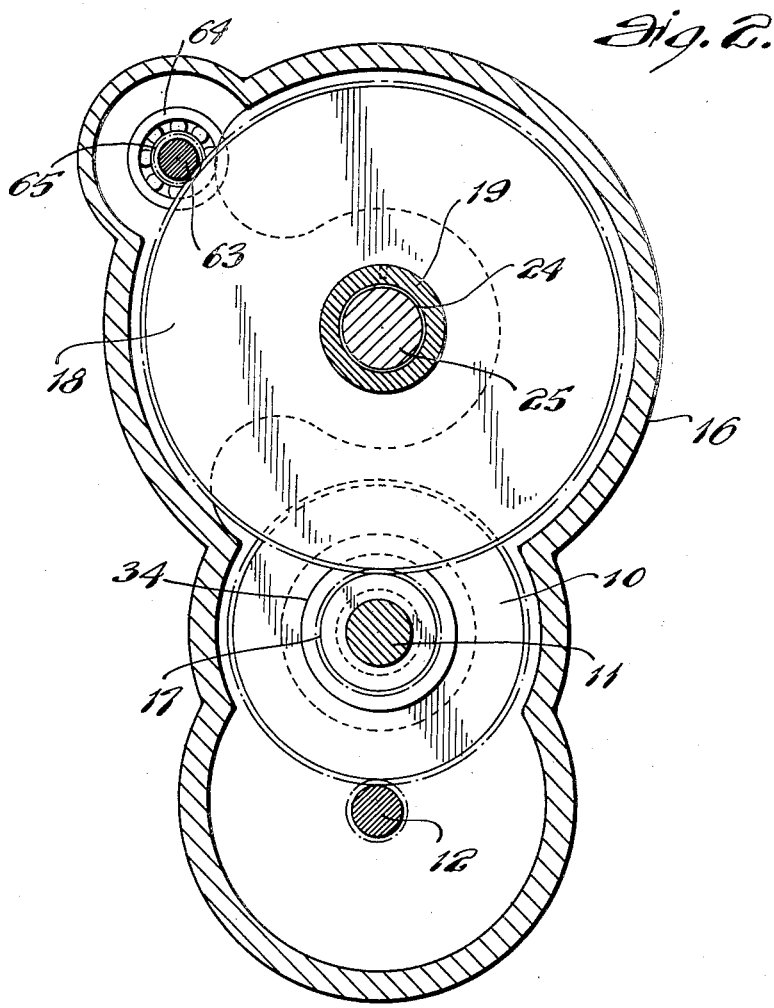
Fig. 2 is a transverse sectional view taken approximately on line 2—2 of Fig. 1.
Figure 3:
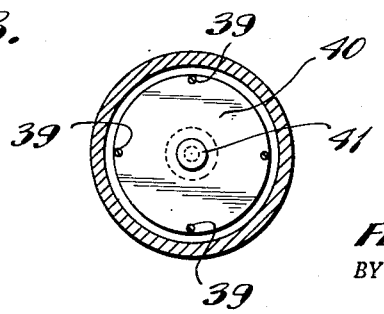
Fig. 3 is a transverse sectional view taken approximately on line 3—3 of Fig. 1.

The invention is illustrated in its application to a linear actuator for moving an operational part of aircraft and the like to different positions and for automatically discontinuing movement of the actuator in the event that the operational part becomes jammed or is obstructed in its movement. In the embodiment illustrated the load limiting drive mechanism includes a drive gear 10 mounted on a shaft 11 and arranged in meshing engagement with a pinion 12 affixed to the outer end of a rotating shaft 13 of a split series reversible direct current motor A.

The shaft 11 is journaled for rotation in bearings 14 and 15 suitably supported in a casing 16 and said shaft has a gear 17 affixed thereto and arranged in meshing engagement with a large gear 18 splined on an elongated sleeve 19 which is journaled for rotation in bearings 20 and 21 disposed on opposite sides of the large gear 18. The sleeve 19 is helically threaded interiorly as at 22 from the forward end thereof to the enlarged bore portion 24 and the same threadedly engages a helical screw 25 providing a linear actuator which is adapted to be operatively connected with an operational part of an aircraft and the like such as a wing flap (not shown). The screw 25 is threaded throughout its length from the enlarged outer end 26 thereof to the recess 27 with the threaded periphery thereof slidably fitting the enlarged bore portion 24.

The driving gear 10 is formed with helical threads 28 on the wall of the axial bore thereof and the shaft 11 is provided with helical threads 29 on the periphery thereof between the sleeves 30 and 31 affixed thereto and forming abutments or stops for limiting the relative turning of the gear 10 on said shaft. Coil springs 32 and 33 are disposed in surrounding relation with the shaft. The coil spring 32 is interposed between the flange 34 of the sleeve 30 and the inner face of the gear 10, while the coil spring 33 is interposed between an annular element 35 and the outer face of the gear 10.

The annular element 35 is slidably fitted on the shaft 11 and is formed with an annular flange 36 which is positioned against the outer race 37 of a bearing 38 slidably fitted on said shaft. The outer race 37 of said bearing is engaged by circumferentially spaced spider arms 39 of an annular adjusting member 40 adapted to be moved inwardly by a manipulating screw 41 threadedly engaged in the casing 16. The spider arms 39 are longitudinally slidable in circumferentially spaced openings 42 in the wall of the casing for moving the bearing 38 and the annular element 35 on the shaft 11 for tensioning the coil springs 32 and 33 in accordance with the setting of the adjusting screw 41.

Two switches 44 and 45 are provided which are suitably mounted on the casing 16 and are in circuit with the motor A with one of the switches adapted to be actuated to brake the circuit with the motor in the event that the operational part becomes jammed or meets with an obstruction during the extending movement of the helical screw, while the other switch is adapted to be actuated to break the circuit with the motor in the event that the operational part becomes jammed or meets with an obstruction during the retraction of the helical screw. For this purpose, the switch 44 is provided with a button 46 connected with a reciprocatory rod 47 slidably mounted in brackets 48 and having an arm 49 at the inner end thereof adapted to engage against the inner face of the gear 10. The switch 45 is provided with a button 50 disposed adjacent to the forward face of the gear 10 and in the path of movement of the outer portion thereof when moved axially on the shaft 11.

The motor is connected with a source of current supply by conductors 51 and 52, the conductor 51 being connected with one of the poles of the motor while the conductor 52 is connected with one of the terminals of the switch 45. A conductor 53 is connected between the other terminal of the switch 45 and a pole of the motor leading to one of the split phases thereof so as to connect the switch 45 in series with the motor. The switch 44 is connected by a conductor 55 with the conductor 52 and by a conductor 54 to a pole of the motor leading to the other split phase thereof to thereby connect the switch 44 in series with the motor. Manually operated switches 56 and 57 are interposed in the conductor lines 52 and 55 for respectively closing the circuits between the switches 44 and 45 and the motor. It will be understood that when either one of the switches 56 and 57 are closed the other switch is open so as to connect either one or the other of the switches 44 and 45 in circuit with the motor.

In the event that the switch 57 is closed to thereby connect the switch 44 with the motor, the motor will rotate in a counter-clockwise direction as viewed from the right which will rotate the gear 10 in a clockwise direction and cause the same to turn on the helical threads 29 until the spring 32 is sufficiently tensioned to cause the shaft 11 to rotate in a clockwise direction with the gear 10. Rotation of the shaft 11 in a clockwise direction will cause rotation of the sleeve 19 in a counter-clockwise direction so as to impart linear outward movement to the screw 25. In the event that the operational part is obstructed in its movement, the resistance to outward movement of the screw 25 will prevent rotation of the sleeve 19 and thereby of the shaft 11. The motor A however, will continue to turn the gear 10 which will turn on the threads 29 to further tension the spring 32 and move the rod 47 inwardly to thereby move the button 46 inwardly and actuate the switch 44 to break the circuit with the motor.

In order to move the operational part in the opposite direction, the switch 57 is opened and the switch 56 is then closed so as to place the switch 45 and the motor in series with a source of current supply. The motor will then operate to rotate the shaft 13 in a clockwise direction as viewed from the right which will cause the gear 10 to rotate in a counter-clockwise direction. The gear 10 will turn on the threads 29 to tension the spring 33 until sufficient tension is placed thereon to cause the shaft 11 to move in a counter-clockwise direction with the gear 10. Rotation of the shaft 11 in a counter-clockwise direction will cause the sleeve 19 to rotate in a clockwise direction so as to effect inward linear movement of the screw 25. In the event that the operational part is obstructed in its movement with the screw 25, the resistance to inward movement of the screw 25 will prevent rotation of the sleeve 19 and shaft 11 whereupon the gear 10 will rotate on the threads 29 until the same moves the button 50 inwardly to actuate the switch 45 to interrupt the circuit with the motor. The movement of the gear 10 relative to the shaft 11 will permit the button 46 to move outwardly and close the switch 44 so as to close the circuit with the motor and permit linear outward movement of the screw 25 by the closing of the switch 57 as heretofore described.

When the load limiting drive mechanism is employed in connection with the operation of wing flaps one such drive mechanism is pivotally connected with each of the wings and the two driving mechanisms are connected together by means of a flexible shaft 58 for operating the two drive mechanisms in synchronism and in the event that the motor in either one of the drive mechanisms is burned out, the other motor will operate both drive mechanisms so as to move both wing flaps. The flexible shaft 58 is connected with a stub shaft 59 mounted for rotation in a bearing 60 and having a bevel gear 61 affixed to the inner end thereof. The bevel gear 61 engages a bevel gear 62 mounted on a shaft 63 journaled at its opposite ends in bearings 64 supported in the casing 11. The shaft 63 is provided with a pinion 65 in meshing engagement with the gear 18.

In order to pivotally connect the drive mechanism to a wing of the aircraft, the casing 16 is provided with a lug 66 disposed in axial alignment with the screw 25 and having a bearing opening 67 adapted to receive a shaft affixed to the plane. The forward end of the screw 25 is provided with an end fitting 68 having a bearing opening 69 adapted to be pivotally connected with the wing flap.

What is claimed is:

1. In a linear actuator, an electric motor, a threaded shaft mounted for rotation, an internally threaded gear mounted on said shaft, means operatively connecting the electric motor with said gear for turning the gear, an electric switch in circuit with said motor, an interiorly threaded sleeve mounted for rotation, means operatively connecting said shaft and sleeve for turning the sleeve with the rotation of the shaft, a screw shaft arranged in threaded engagement in said sleeve for imparting linear movement thereto with the rotation of said sleeve, and means resiliently tensioning said gear against relative movement with reference to the first named shaft whereby said shaft is rotated by the turning of said gear and said means permitting of relative movement of said gear with reference to said shaft to thereby actuate said switch and discontinue operation of the motor in the event that movement of said screw shaft is obstructed so as to retard the rotation of the first named shaft.

2. In a linear actuator, an electric motor, a helically threaded shaft mounted for rotation, an internally helical threaded gear in threaded engagement on said shaft, means operatively connecting the electric motor with said gear for turning the gear, a pair of switches in circuit with said motor, an interiorly helical threaded sleeve mounted for rotation in opposite directions, means operatively connecting said shaft and sleeve for turning the sleeve with the rotation of the shaft, a screw shaft arranged in threaded engagement in said sleeve for imparting outward linear movement to said screw shaft with the rotation of said sleeve in one direction and for imparting inward linear movement thereto with the rotation of said sleeve in the opposite direction, and spring means resiliently tensioning the gear against relative movement on the threaded engagement thereof with the first named shaft whereby said shaft is rotated by said gear and said spring means permitting of relative movement of said gear with reference to said shaft in either direction to respectively actuate said switches and discontinue operation of the motor in the event that movement of said screw shaft in either direction is obstructed so as to prevent rotation of the first named shaft.

3. In a linear actuator, an electric motor, a helically threaded shaft mounted for rotation, an internally helical threaded gear in threaded engagement on said shaft, means operatively connecting the electric motor with said gear for turning the gear, an electric switch in circuit with said motor and having a part adapted to be engaged by the gear to discontinue operation of the motor when the gear is moved relative to said shaft, an interiorly helical threaded sleeve mounted for rotation, means operatively connecting said shaft and sleeve for turning the sleeve with the rotation of the shaft, a screw shaft arranged in threaded engagement in said sleeve for imparting linear movement thereto with the rotation of said sleeve, and spring means tensioning said gear against relative movement on the threaded engagement thereof with the first named shaft whereby said shaft is rotated by the turning of said gear and said spring means permitting of relative movement of said gear with reference to said shaft to thereby engage said part and actuate said switch to discontinue operation of the motor when said screw shaft is obstructed in its movement so as to prevent rotation of the first named shaft.

4. In a linear actuator, a casing, said casing having means mounting the same for pivotal movement, a screw shaft mounted in said casing and having a protruding end, said protruding end having means for pivotally connecting the same to an operational part to be moved by said shaft, an electric motor affixed to said casing, a threaded shaft mounted for rotation in said casing, a gear having an interiorly threaded bore mounted on said shaft, means operatively connecting said gear with the electric motor for turning the gear, an electric switch in circuit with said motor, and spring means tensioning said gear against relative movement with reference to the last named shaft whereby said shaft is rotated by the turning of said gear, and said spring means permitting of relative movement of said gear axially of said shaft to thereby actuate said switch and discontinue operation of the motor in the event that the load on said screw shaft exceeds the tension of said spring means.

5. In a linear actuator, an electric motor, a shaft mounted for rotation, a gear mounted on said shaft, means operatively connecting said gear with said electric motor for turning the gear, an electric switch in circuit with said motor, said shaft and gear having interengaging screw threads, and spring means tensioning said gear against relative movement on the threaded engagement with said shaft whereby said shaft is rotated by the turning of said gear and said spring means permitting of relative movement of said gear axially of said shaft to actuate said switch and discontinue operation of the motor in the event that the torque on the gear exceeds the tension of said spring.

6. In a linear actuator, an electric motor, a shaft mounted for rotation, a gear mounted on said shaft, said shaft and gear having interengaging screw threads, means operatively connecting said gear with said electric motor for turning the gear, an electric switch in circuit with said motor, an interiorly threaded member mounted for rotation, a screw shaft arranged in threaded engagement with said member for imparting linear movement thereto with the rotation of said member, means operatively connecting said member and said first named shaft for turning the member with the rotation of the shaft, and a spring resiliently tensioning said gear against relative movement of said first named shaft whereby said shaft is rotated by said gear, and said spring permitting of relative movement of said gear axially of said shaft to thereby actuate said switch and discontinue operation of said motor in the event that said screw shaft is obstructed in its movement.

7. In a device of the character described, an exteriorly threaded shaft mounted for rotation, a gear threadedly mounted on said shaft, electric means for driving said gear, a rotating means operatively connected with said shaft and rotated thereby, an electric switch in circuit with said motor, and means tensioning said gear against relative movement with reference to said shaft whereby said shaft is rotated by the rotation of said gear and said means permitting of relative turning of the gear with reference to the shaft to thereby actuate said swich and discontinue operation of said motor in the event that the load on said rotating means exceeds the tension on said gear.

FELIX R. AMBROSE.

No referencees cited.